Patented Nov. 8, 1927.

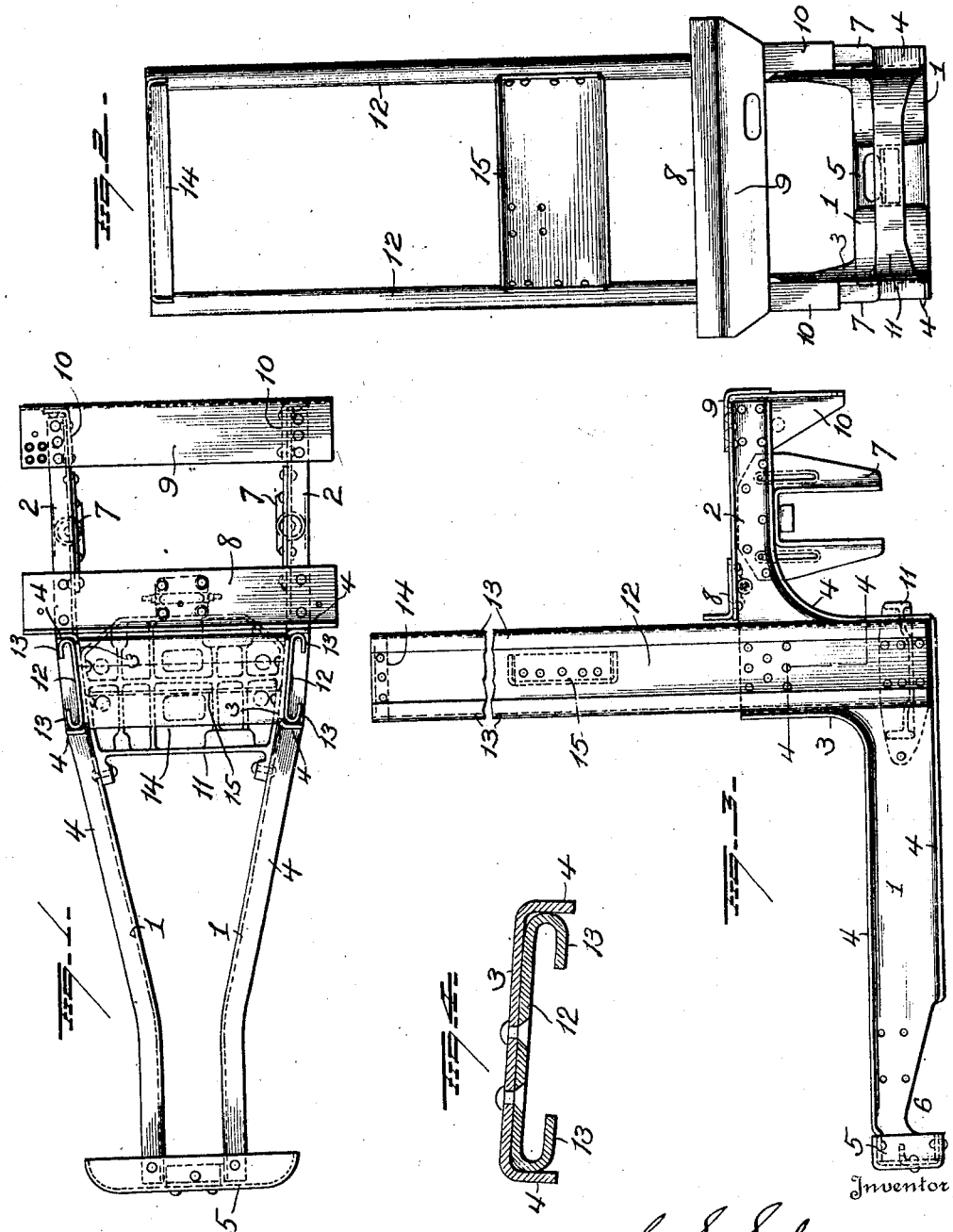

1,648,826

UNITED STATES PATENT OFFICE.

CHARLES SCHEREN SCHROEDER, OF STAMFORD, CONNECTICUT, ASSIGNOR TO THE YALE & TOWNE MANUFACTURING COMPANY, OF STAMFORD, CONNECTICUT.

INDUSTRIAL TRUCK.

Application filed September 17, 1923. Serial No. 663,193.

This invention relates to trucks of that type in which the load-carrying platform is movable vertically on guides rising from and secured to a wheel-supported frame which also carries an operator's stand, a motor, and controlling devices. The invention has special reference to the frame construction and has for its object the provision of a rigid frame which is lighter and stronger than the frames heretofore used. This object is attained in such a structure as is illustrated in the annexed drawing and the invention consists in certain novel features which will be hereinafter fully set forth.

In the drawing, Figure 1 is a plan view of a truck frame embodying my improvements;

Figure 2 is a front elevation of the same;

Figure 3 is a side elevation;

Figure 4 is a detail horizontal section on the line 4—4 of Figure 3.

In carrying out my invention, I employ two side frame members 1 which are constructed of pressed steel and are of counterpart form and symmetrically disposed in the completed frame, that is, they converge toward their rear ends while their forward portions 2 are substantially parallel as shown clearly in Fig. 1. The forward portion 2 of each side frame member is disposed in a higher horizontal plane than the rear or major portion of the frame and an intermediate vertical web 3 integrally connects the rear end of the front portion with the front end of the rear major portion. Outwardly projecting flanges 4 are formed along the edges of the side members thereby imparting strength and rigidity to the unit. The rear extremities of the side members are connected by a beam or cap plate 5 which is of channeled formation to receive the ends of the side members and is riveted or otherwise rigidly secured thereto so as to brace the structure and maintain the side members in the proper spaced relation. The lower edges of the side members are properly recessed, as at 6, to accommodate the rear truck wheels, and to the upper forward portions 2 I secure the pedestals or bearing frames 7 for the front truck wheels. Extending across and secured rigidly upon the front portions 2 of the side frames are a rear connecting plate 8 and a front connecting plate 9 which constitute rests or a support for a storage battery furnishing current to a motor for driving the truck and the operating elements mounted thereon. These connecting plates 8 and 9 are of angular form, the vertical web of the plate 8 upstanding and presenting a guard to prevent interference between the battery and the elevating cable (not shown). The vertical web of the plate 9 is downturned and bears against the front ends of the side members, furnishing a support for the controlling switch and other elements and serving as a fender to protect the operator from injury by contact with the ends of the side members. Corner plates 10 are secured to the front ends of the side members and depend therefrom to provide supports for the operator's stand.

Between the side members, at the lower ends of the vertical connecting webs 3, I secure a truss 11 which is preferably of the form shown but may be of any suitable shape which will possess the proper strength. Standards or vertical guide members 12 are secured to the outer sides of the webs 3 and these guides are formed on their outer sides at their edges with re-entrant flanges 13 defining opposed channels or grooves in which the load-sustaining platform may be guided. It is to be particularly noted that the guide members 12 fit closely between the vertical portions of the flanges 4 on the side members and thereby transfer some of the strain from the securing rivets to the material of the side frames. In order to reenforce and impart rigidity to the vertical guides or standards, a cap beam 14 is secured to and extends between their upper ends and a cross bar or beam 15 is secured between them at an intermediate point of their height.

From the foregoing description, taken in connection with the accompanying drawing, it will be seen that I have a side frame member in a single strong and rigid unit, and that the vertical guide member is held in a pocket formed on the side member in such a manner that the strain is carried directly by the side member instead of being placed upon a riveted joint, the entire frame being lighter and stronger than the frames now generally employed.

Having fully described my invention what I claim as new and desire to secure by Letters-Patent, is:—

1. A truck frame comprising side members each consisting of an intermediate vertical portion, a portion projecting forwardly from the upper end of the vertical portion, and a portion projecting rearwardly from the lower end of the vertical portion, said forwardly and rearwardly projecting portions being each in a single horizontal plane from end to end thereof, and rigid connections between the side members at the vertical portions and at the ends of the forwardly and rearwardly projecting portions.

2. A truck frame comprising side members of pressed material having flanges on their outer sides defining vertically extending pockets, and vertical guide members secured in and rising from said pockets.

3. A truck frame comprising side members each having an upper forwardly extending portion, a lower rearwardly extending portion, and an intermediate vertical web integrally uniting said portions, and cross plates connecting the forwardly extending portions and secured upon the tops thereof, said cross plates constituting supports for controlling elements in advance of the vertical web.

4. A truck frame comprising side members each having an upper forwardly projecting portion, a lower rearwardly projecting portion, and an intermediate vertical web integrally uniting said portions, rigid connections between the ends of the lower portions, rigid connections between the upper portions, and pendent wheel mountings carried by the upper portions.

5. A truck frame comprising side members having vertically extending pockets on their outer sides, guide members secured in and rising from said pockets, and a trussed brace secured to and extending between the side members at the pockets.

6. A truck frame comprising side members having vertical flanges on their outer sides, and vertical guide members secured on the outer sides of the side members between the flanges thereon, the guide members being provided on their outer sides with reentrant flanges along their vertical side edges bearing against the flanges on the side members.

7. A truck frame comprising side members each having an upper forwardly extending portion, a lower rearwardly extending portion, and a vertical web uniting said portions, connections between the ends of the side members, a trussed brace connecting said vertical webs, guide members secured on the outer sides of said webs and rising above the same, and connections between said guide members.

In testimony whereof, I have signed this specification.

CHARLES SCHEREN SCHROEDER.